(12) United States Patent
Schulz

(10) Patent No.: US 7,632,006 B2
(45) Date of Patent: Dec. 15, 2009

(54) DEVICE FOR PROCEEDING MATERIAL BY MIXING AND/OR PLASTICIZATION OR AGGLOMERATION PROVIDING PERIODIC ENLARGEMENT OR REDUCTION TO GAP BETWEEN SCREW CHANNELS

(76) Inventor: Helmuth Schulz, Hirschgasse 16/12, A 4020 Linz, Österreich (AT)

( * ) Notice: Subject to any disclaimer, the term of this patent is extended or adjusted under 35 U.S.C. 154(b) by 0 days.

(21) Appl. No.: 12/085,489

(22) PCT Filed: Nov. 23, 2008

(86) PCT No.: PCT/AT2006/000478

§ 371 (c)(1),
(2), (4) Date: Oct. 22, 2008

(87) PCT Pub. No.: WO2007/059547

PCT Pub. Date: May 31, 2007

(65) Prior Publication Data

US 2009/0040867 A1    Feb. 12, 2009

(30) Foreign Application Priority Data

Nov. 25, 2005    (AT)  .............................. A 1915/2005

(51) Int. Cl.
*B29B 7/34* (2006.01)
*B29C 47/44* (2006.01)
(52) U.S. Cl. ............................ 366/78; 366/85; 366/100; 366/289
(58) Field of Classification Search ................... 366/69, 366/78–100, 297–301, 318–324, 289; 425/200–209
See application file for complete search history.

(56) References Cited

U.S. PATENT DOCUMENTS

| 1,956,141 | A | * | 4/1934 | Vogt | ............................ | 165/92 |
| 3,301,138 | A | * | 1/1967 | Cox | ............................ | 91/221 |
| 3,314,660 | A | * | 4/1967 | Arbiter | ........................ | 366/289 |
| 3,380,116 | A | * | 4/1968 | Loomans et al. | .............. | 366/99 |
| 3,387,826 | A | * | 6/1968 | Loomans | ...................... | 366/77 |

(Continued)

FOREIGN PATENT DOCUMENTS

CN    1 644 341    7/2005

(Continued)

OTHER PUBLICATIONS

International Search Report, Apr. 2007.

*Primary Examiner*—Charles E Cooley
(74) *Attorney, Agent, or Firm*—Collard & Roe, P.C.

(57) ABSTRACT

A device for processing material by mixing and/or plasticization or agglomeration has a screw housing, in which at least two screws are situated adjacent to one another. The screw channels are engaged with one another. The screws are driven to rotate by at least one motor. The screws are supplied with the material through an intake opening of the screw housing and the processed material leaves the screw housing through at least one outlet opening. An apparatus is provided, which in operation of the device provides the gap which exists between adjacent screw channels of the screws alternately with a periodic enlargement or reduction, which is superimposed on the rotational movements of the two screws. In the method for material processing, the material, in addition to the compaction which is caused by the conveyance action of the screws, is subjected to periodic squeezing by the screws.

11 Claims, 7 Drawing Sheets

U.S. PATENT DOCUMENTS

| | | | | |
|---|---|---|---|---|
| 3,506,066 A * | 4/1970 | Nonnenmacher | ............ | 165/87 |
| 4,408,888 A * | 10/1983 | Hanslik | ........................ | 366/83 |
| 4,773,763 A * | 9/1988 | Weber | ........................ | 366/83 |
| 5,232,280 A * | 8/1993 | Moriyama | .................... | 366/83 |
| 5,415,473 A * | 5/1995 | Nakano et al. | ................. | 366/83 |
| 5,803,597 A * | 9/1998 | Giani | ........................ | 366/83 |
| 5,836,681 A * | 11/1998 | Giani | ........................ | 366/83 |
| 6,234,661 B1* | 5/2001 | Thewes | ..................... | 366/100 |
| 2009/0040867 A1* | 2/2009 | Schulz | ........................ | 366/301 |

FOREIGN PATENT DOCUMENTS

| | | |
|---|---|---|
| DE | 1 200 517 | 9/1965 |
| DE | 1 529 812 | 3/1970 |
| DE | 2 051 885 | 7/1972 |
| DE | 34 20 918 | 12/1985 |
| DE | 35 04 390 | 9/1986 |
| DE | 41 29 913 | 3/1993 |
| DE | 4129913 A1 * | 3/1993 |
| EP | 0 315 143 | 5/1989 |
| EP | 1352729 A1 * | 10/2003 |
| JP | 55049134 A * | 4/1980 |
| JP | 62064505 A * | 3/1987 |
| JP | 02211233 A * | 8/1990 |

* cited by examiner

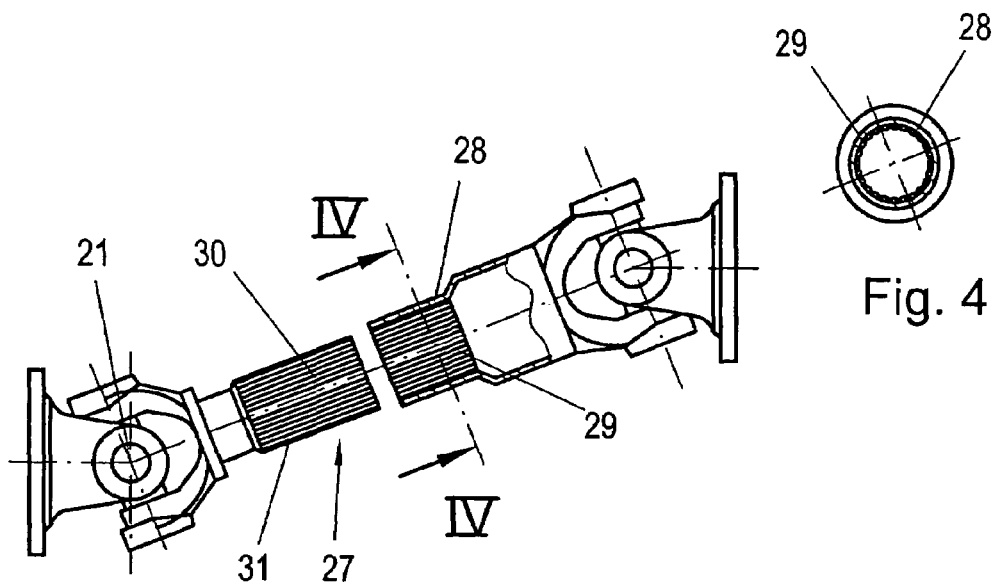
Fig. 3
Fig. 4
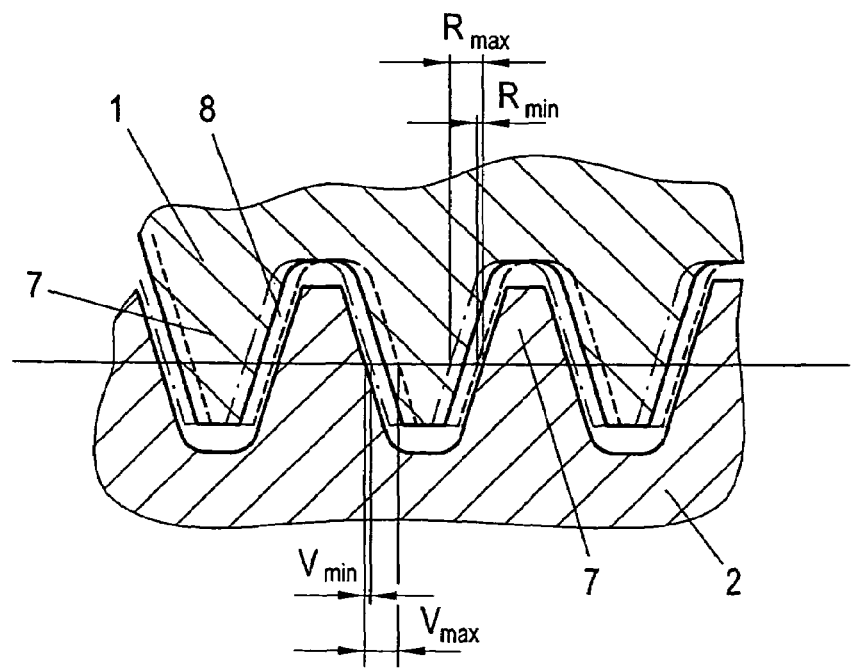
Fig. 5

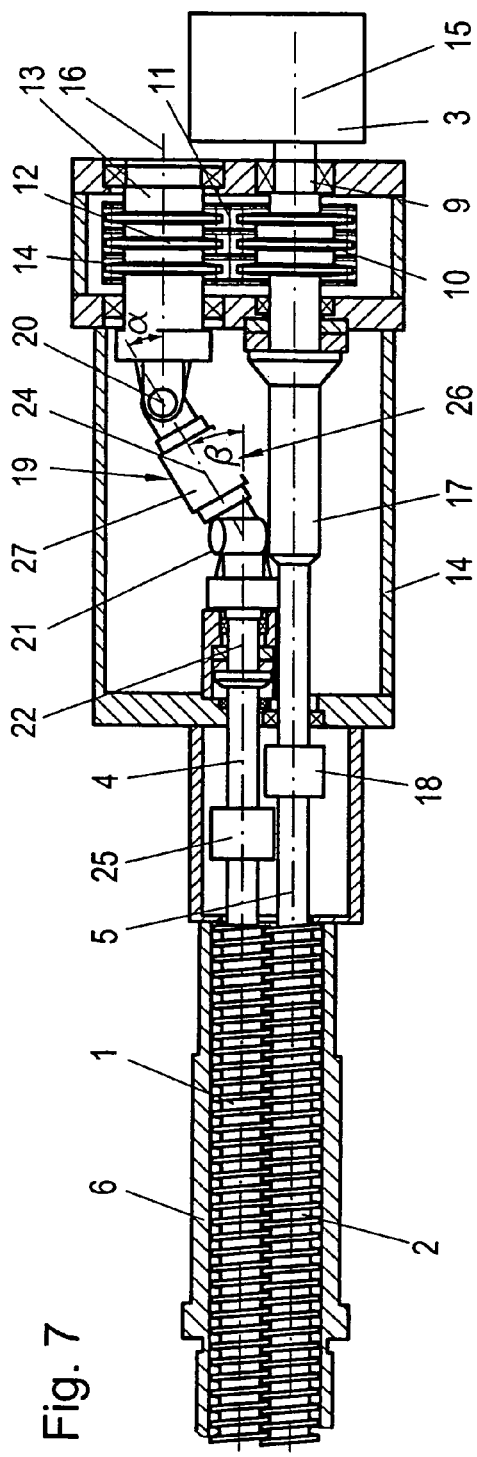
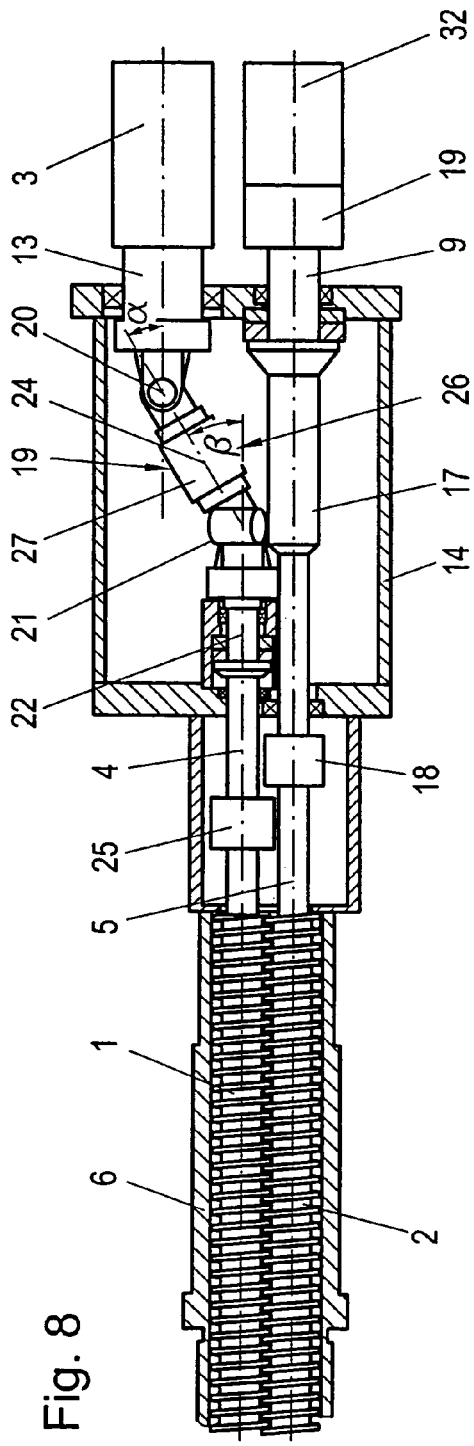
Fig. 7
Fig. 8

DEVICE FOR PROCEEDING MATERIAL BY MIXING AND/OR PLASTICIZATION OR AGGLOMERATION PROVIDING PERIODIC ENLARGEMENT OR REDUCTION TO GAP BETWEEN SCREW CHANNELS

CROSS REFERENCE TO RELATED APPLICATIONS

This application is the National Stage of PCT/AT2006/000478 filed on Nov. 23, 2006, which claims priority under 35 U.S.C. §119 of Austrian Application No. A 1915/2005 filed on Nov. 25, 2005. The international application under PCT article 21(2) was not published in English.

FIELD OF THE INVENTION

The invention relates to a device for processing material by mixing and/or plasticization or agglomeration, having at least two screws situated adjacent to one another in a screw housing, whose screw channels are engaged with one another and are driven to rotate around the particular screw axis by a least one motor, the material to be processed being supplied to these screws through at least one intake opening of the screw housing positioned in the area of one front end of the screws, and the material processed by the screws leaving the screw housing through at least one outlet opening of the screw housing positioned in the area of the other front end of the screws.

Furthermore, the invention relates to a method for material processing by mixing and/or plasticization or agglomeration.

DESCRIPTION OF THE PRIOR ART

Devices of the type described at the beginning are known as twin-screw extruders in numerous embodiments. A frequent area of application of such twin-screw extruders is mixing different types of polyolefins and/or compounding plastics of different types, such as polyethylene of lower and higher density or polypropylene with polyethylene. Material types of this type are frequently used for the production of blow films and/or injection-molded articles. Achieving a high degree of mixing is important for this purpose and the twin-screw extruders known up to this point have not been entirely satisfactory in this regard.

Another area of application is the processing of plastic materials, in particular thermoplastics, for the purpose of producing a recycled product, which is suitable for employment in the field of food packages, such as PET (polyethylene terephthalate). Plastic materials of this type are usually provided as a loose bulk product, whose specific weight is comparatively low. This has the result that to achieve a sufficient throughput, large quantities of material to be processed must be received in the intake area of the screws. These material quantities must then be plasticized and/or agglomerated to the desired degree in the course of the transport occurring through the screws from the intake opening to the outlet opening, to obtain a product of the desired quality at the outlet. By selecting a suitable geometry of the screw channels, this problem may be overcome to a certain degree, however, this is opposed by the fact that the ratios in the plastic material to be processed are not always identical, in particular in regard to the size of the material parts to be processed, but also their material type, degree of contamination, etc. The known twin-screw extruders have also not proven to be entirely satisfactory in this regard.

However, other areas of application for devices of the type described at the beginning are also conceivable, e.g., the processing of macromolecular materials of greatly varying types, i.e., both organic and also inorganic macromolecules. The first group is to be understood to include both natural polymers (biopolymers) i.e., for example, polysaccharides, such as cellulose, starches, etc., polylactides, polyisoprenes, e.g., rubber, etc., and also synthetic polymers of greatly varying types, of which soft thermoplastics are the most significant type. Among inorganic macromolecules, polysiloxanes and silica gels are the most important. A further area of application is the mixing of mineral materials in powdered or pasty form, e.g., clay or other starting materials for greatly varying areas of application.

A degree of mixing is also important in the processing for these applications, to obtain the most homogeneous possible starting material and/or to crush and homogenize the starting material provided in the form of coarse chunks for the intended purpose.

SUMMARY OF THE INVENTION

The invention is based on the object of solving the problems described in another way and improving the processing of a broad spectrum of types of materials, so that the product obtained at the output of the device meets the requirements, which have increased ever further in recent time. This applies both for achieving an improved degree of mixing in comparison to known designs in the case of processing different types of materials in the broadest meaning, and also in regard to improving the quality of plastic products, in particular recycled products, which are to be used in the field of food packaging. The technical outlay is also to remain comparatively low, so that set-up costs of the device are saved.

The invention achieves this object in that in a device of the type described at the beginning, an apparatus is provided which in operation of the device alternately provides the gap existing between screw channels of the screws adjacent to one another with a periodic enlargement and reduction, which is superimposed on the rotational movements of the screw channels of the screws. In this manner, a running enlargement and reduction of the flank play from one screw to the other results, i.e., an oscillating change of the gap width, by which a very high degree of mixing and thus better processing of the material is achieved upon every revolution of the screws, because a squeezing and/or kneading action also results in the axial direction upon every revolution of the screws. In addition, the convergence of adjacent screw channels when the gap is reduced also causes a desirable self-cleaning effect.

Although the present invention is primarily significant in twin-screw extruders, it is entirely possible to also apply the principle according to the invention in devices which have more than two screws working together with one another.

There are multiple possibilities in principle in the scope of the invention for achieving the cited oscillating enlargement and reduction of the gap during running operation. A preferred embodiment in the scope of the invention is that the apparatus for one of the screws has a universal shaft for the rotational drive for this screw, this universal shaft having two Cardan joints connected to one another rotationally fixed, of which one is connected rotationally fixed on its drive side to a drive shaft driven by the motor, while in contrast the other is connected rotationally fixed on its output side to an output shaft connected rotationally fixed to the screw, the axial direction of the output shaft deviating from the axial direction of the drive shaft and/or the two Cardan joints being pivoted in relation to one another around the connecting axis. A periodic deceleration or acceleration of the revolving movement results for the screw driven via such a gearing unit due to this deviation of the directions of output shaft and drive shaft and/or due to the relative twisting of the two Cardan joints, which is equivalent to the cited reduction and enlargement of the gap existing between the screw channels of the two screws. It is also advantageous in this case that a design of this type may be adapted easily to different existing conditions, e.g., in that the axial direction of the output shaft is changeable adjustably in relation to the axial direction of the drive shaft, which has an effect on the way in which the gap is enlarged and decreased in an oscillating manner. Another possibility for changing the size or type of the oscillating change of the gap width according to the invention is that a coupling is provided, using which the rotational position of one Cardan joint in relation to the other Cardan joint is adjustably changeable.

Another fundamental possibility for periodically changing the cited gap during running operation in the scope of the invention is that the apparatus drives the screws differently for the rotational movement, one screw being driven at constant speed, while in contrast another screw is driven using a periodic acceleration and deceleration superimposed on the constant speed. A speed control of this type may be achieved without problems by electronic apparatuses known per se. Such a control may also be performed, of course, in that the size and/or type of the periodic acceleration and deceleration is adjustably changeable.

A further possibility for achieving the cited change of the gap width during running operation in the scope of the invention is that the apparatus provides a limited displaceability of one screw in its axial direction in the screw housing, and an additional drive is provided for this screw, which provides the screw with a periodic back-and-forth displacement in the axial direction superimposed on its rotation. While in the embodiments described up to this point, the axial location of the two screws remains unchanged and the cited gap change is achieved by changing the speed of one screw, it is different in the last described embodiment: one screw is shifted back and forth in its axial location, however, always driven at constant speed, like the other screw(s). There are again multiple possibilities in the scope of this fundamental type of design, the additional drive for the displaceable screw may thus have a fixed curve path, on which a tappet connected to the screw runs, or the additional drive may be formed by a piston-cylinder assembly causing the periodic back-and-forth movement of the screw.

In principle, the individual cited fundamental variants may even be applied in combination with one another. It is thus possible without problems, for example, to combine the Cardan joint design described above with a control of the speed of the affected screw, etc. However, one of the cited variants will typically suffice without problems.

The extent of the change of the cited gap between adjacent screw channels is solely limited in that a reduction of the gap width may only be driven up to contact of the two screw channels. As experiments have shown, however, a 40 to 60% change of the gap width will suffice (in relation to the maximum possible gap width). Especially favorable conditions have resulted with a 50% change of the gap width.

Special advantages result when the invention is applied to unidirectional conical twin-screw extruders, although the invention may also be advantageously applied for twin-screw extruders running in opposite directions and for cylindrical twin-screw extruders (running in the same or opposite directions). In conical twin-screw extruders, the screw diameter is greater in the intake area of the material than at the outlet end, because of which a compaction of the material results automatically in the course of the material transport, as a result of the diameter difference provided by the screw geometry. The cited large diameter in the intake area counteracts the circumstance cited at the beginning that the processing of loose bulk goods is frequently performed, which may be received with fewer problems due to the large receptacle volume in the intake area than in designs of other constructions. Due to the continuous reduction of the volume available to the material toward the screw tip, the desired material compaction occurs automatically with uniform screw pitch, and the screw channels always remain at least approximately uniformly filled. Furthermore, increased friction exerted by the screw channels engaging with one another exists in the intake area due to the higher peripheral velocity of large parts of the screw channels, which is favorable in the processing of numerous types of material, in particular for thermoplastics which are to be plasticized and/or agglomerated. This increased friction is also supported by the kneading effect achieved in addition to the cited material compaction using the invention. It has been shown that using such designs according to the invention, similar results as were possible in known designs having greater screw length may be achieved with significantly shorter screw lengths.

A further advantage of conical twin-screw extruders is that the core diameter of the screws may be kept comparatively large in the intake area, so that a high torque may be transmitted to these components. The danger of breaking is therefore significantly less than in known designs. This is especially important, because one frequently deals with materials to be reclaimed, in which foreign bodies, such as steel parts, rocks, or the like are frequently present.

For non-conical, i.e., cylindrical screws, the cited material compaction may be achieved without problems by a change of the pitch of the screw channels in the conveyance direction of the screws.

The method according to the invention for material processing by mixing and/or plasticization or agglomeration using at least two screws driven by motors and mounted in a shared housing, whose screw channels are adjacent to one another in such a manner that a gap exists between the screw channels of the screws, is that in addition to the compaction which is caused by the conveyance effect of the screws, the material is subjected to a periodic squeezing by the screws. In particular, the periodic squeezing is achieved by periodic speed change of at least one of the screws and/or by periodic displacement of at least one of the screws in its axial direction.

As already noted, the device according to the invention and the method according to the invention are particularly suitable for mixing and/or plasticization or agglomeration of macromolecular material and/or mineral material, of any type.

BRIEF DESCRIPTION OF THE DRAWING

Exemplary embodiments of the object of the invention are schematically illustrated in the drawing. FIG. 3 shows a detail of FIG. 2 in the disassembled state and FIG. 4 is a section along line IV-IV of FIG. 3. FIG. 5 shows the reduction or enlargement of the gap. FIGS. 6, 7, and 8 each show a further exemplary embodiment in longitudinal section.

DESCRIPTION OF THE PREFERRED EMBODIMENT

Figure 1:
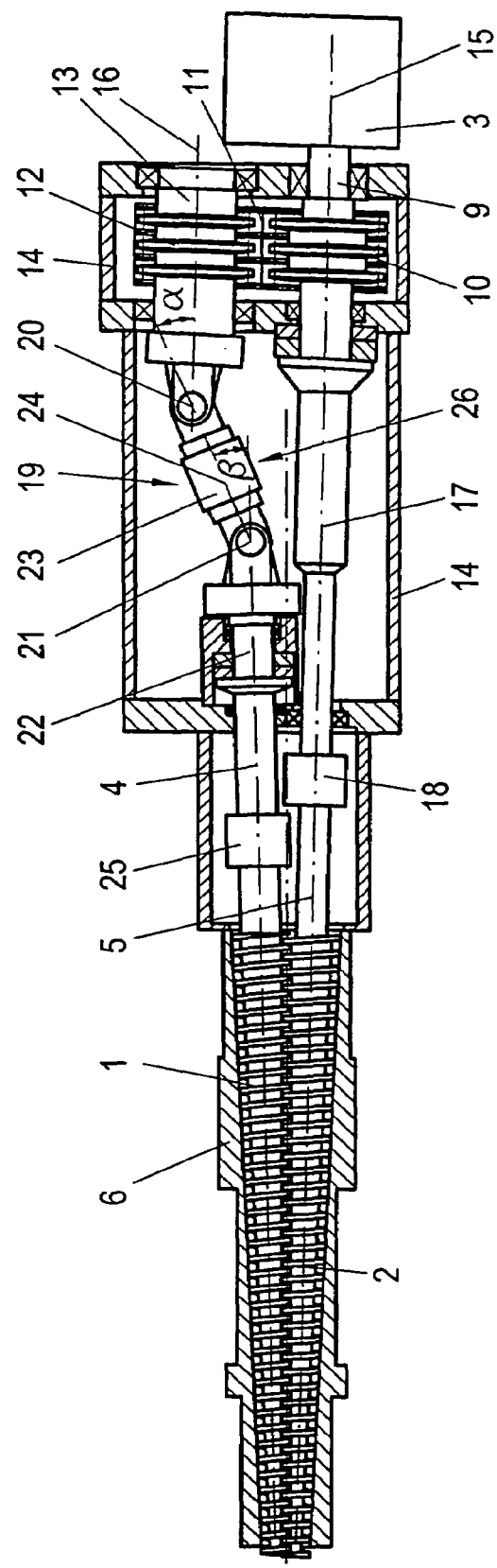
FIG. 1 shows a first exemplary embodiment of the invention in longitudinal section.

The exemplary embodiment according to FIGS. 1 through 5 shows a twin-screw extruder having two conical screws 1, 2, which are driven by a shared motor 3 to rotate in the same direction around their axes 4, 5. The conicity of the screws 1, 2 causes their axes 4, 5 to enclose an acute angle with one another. The two screws 1, 2 are mounted in a shared screw housing 6 and their screw channels 7 (FIG. 5) engage in one another, i.e., the screw channels mesh with one another, but are at an axial distance to one another, so that a gap 8 (FIG. 5) remains between the screw channels 7 of the two screws 1, 2.

The motor 3 drives the drive shaft 9, on which multiple chain wheels 10 are seated, which are connected via drive chains 11 to further chain wheels 12, which are seated on a further drive shaft 13. The two shafts 9, 13 are mounted so they are rotatable in a shared housing 14 and are driven to revolve in the same direction via the drive chains 11. Their axes are parallel to one another. The axis 15 of the shaft 9 is coincident with the axis of the screw 2. The shaft 9 is connected rotationally fixed via an extension 17 to the core of the screw 2. The shaft 9 having its extension 17 may be implemented in one piece with the core of the screw 2. However, if such an implementation would be too long, a coupling 18 may be provided between the extension 17 and the core of the screw 2. Not only is the production of the screw 2 made easier in this manner, but rather also its disassembly, for example, for the purpose of replacement or maintenance. The other shaft 13 is connected via an apparatus 19 to the screw 1, this apparatus 19 providing the screw 1 with a periodic acceleration and/or deceleration of the peripheral velocity as the drive shaft 13 rotates. For this purpose, the apparatus 19 has two Cardan joints 20, 21 which are connected to one another rotationally fixed. One Cardan joint 20 is connected rotationally fixed to the shaft 13, the other Cardan joint 21 to a connection shaft 22, which may be implemented in one piece with the core of the screw 1 or is connected rotationally fixed to the core of the screw 1 via a coupling 25. The two Cardan joints 20, 21 form a universal shaft 26 together with a linkage 23 connecting them. The linkage 23 may be formed in the simplest case by a rod whose axis is identified by 24. Because the axes 4, 5 of the two screws 1, 2 are not parallel to one another, but the axes 15, 16 of the two drive shafts 9, 13 are, the angle α between the axis 16 of the shaft 13 and the axis 24 of the linkage 23 is greater than the angle β which the axis 24 of the linkage 23 encloses with the axis 4 of the screw 1. The difference of the two angles α,β forms an angle of inflection, which has the result that the universal shaft 26 having the two Cardan joints 23, 24 causes the cited acceleration and deceleration of the rotational movement of the screw 1. The screw 2, in contrast, is driven at constant peripheral velocity.

Figure 2:
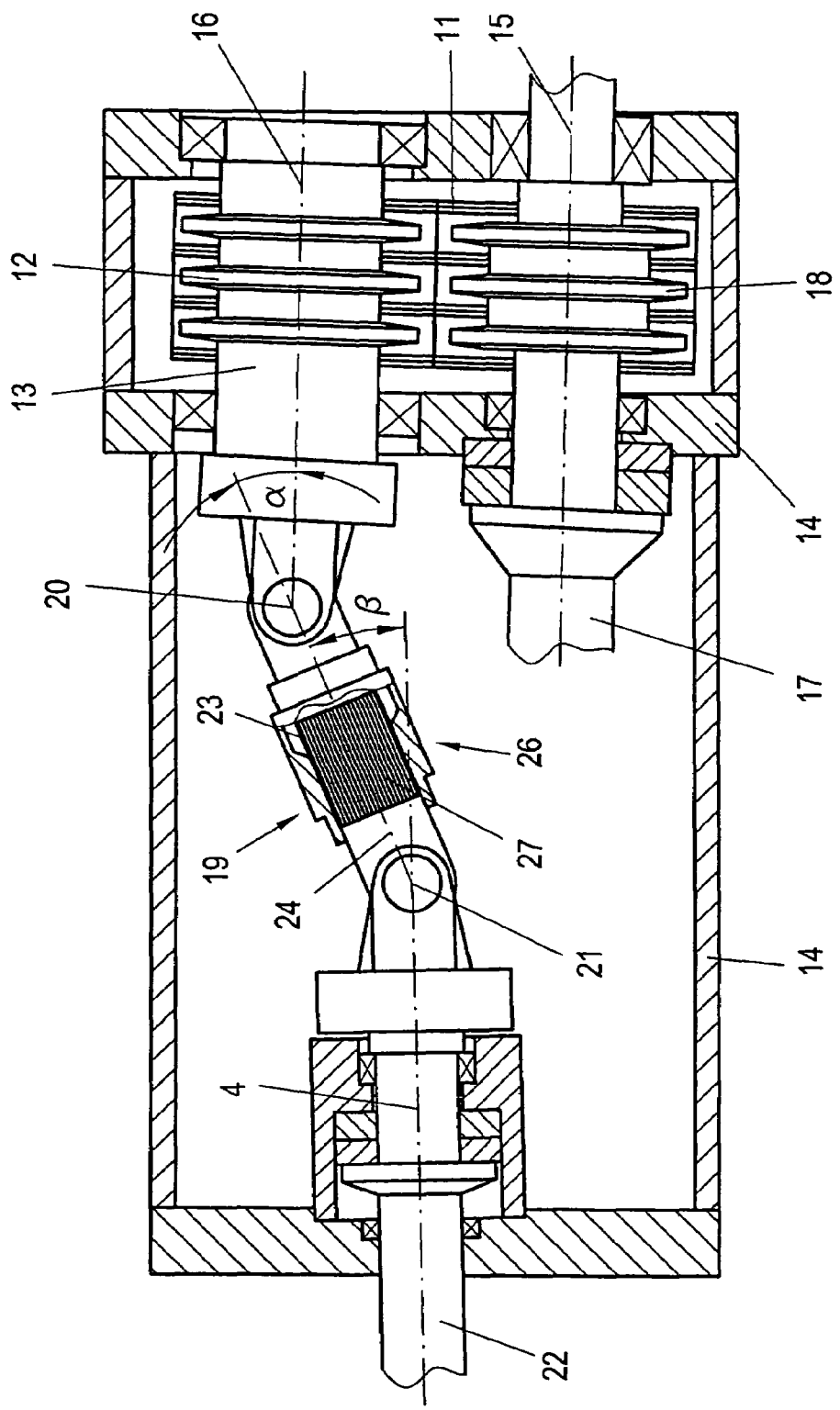
FIG. 2 shows a detail of the design from FIG. 1 in a larger scale.

FIG. 2 shows this drive of the connection shaft 22 in a larger scale. As shown, the drive side of the Cardan joint 20 is connected rotationally fixed to the drive shaft 13 driven by the motor 3. The other Cardan joint 21 is connected rotationally fixed on its output side to the connection shaft 22, which is in turn connected rotationally fixed to the core of the screw 1, possibly via the coupling 25. The output side of the Cardan joint 20 is connected rotationally fixed in the way typical for universal shafts to the drive side of the Cardan joint 21. However, the angle of this connection is adjustable, so that the cited deceleration or acceleration of the rotation of the screw 1 is variable. For this purpose, the linkage 23 connecting the two Cardan joints 20, 21 rotationally fixed has a coupling 27, using which the rotational position of the output-side Cardan joint 21 is adjustably changeable in relation to the drive-side Cardan joint 20, around the axis 24 connecting the two Cardan joints 20, 21. This coupling 27 is shown in the disassembled state in FIG. 3. It has a receptacle 28 connected rotationally fixed to the output side of the Cardan joint 20, which is provided with internal teeth 29. Teeth 30, which are positioned on the circumference of a socket pin 31 connected rotationally fixed to the drive side of the Cardan joint 21, may be plugged fitting into these internal teeth 29.

The enlargement and reduction of the gap 8 caused by the cited periodically changing peripheral velocity of the screw 1 is shown in greater detail in FIG. 5, this gap existing between the screw channels 7 of the two screws 1, 2. A maximum gap width $V_{max}$ and a minimum gap width $V_{min}$ result for the screw channel 7 of the screw 1 on its forward side, seen in the conveyance direction of the screws, in operation. Similarly, a maximum gap width $R_{max}$ and a minimum gap width $R_{min}$ result on the rear side of the screw channel 7 of the screw 1. This minimum gap width may be set so small that a contact of screw channels 7 of the two screws 1, 2 opposite to one another is still just avoided. In practice, however, one typically manages with a 40 to 60% change of the screw gap, in relation to the maximum possible dimension of the gap 8. It is typically not necessary to change the profile of the screw channels 7 in relation to typical profile shapes. In special cases, however, adapting the profile of the screw channels 7 appropriately because of the cited reduction and increase of the gap 8 may be indicated.

Figure 6:
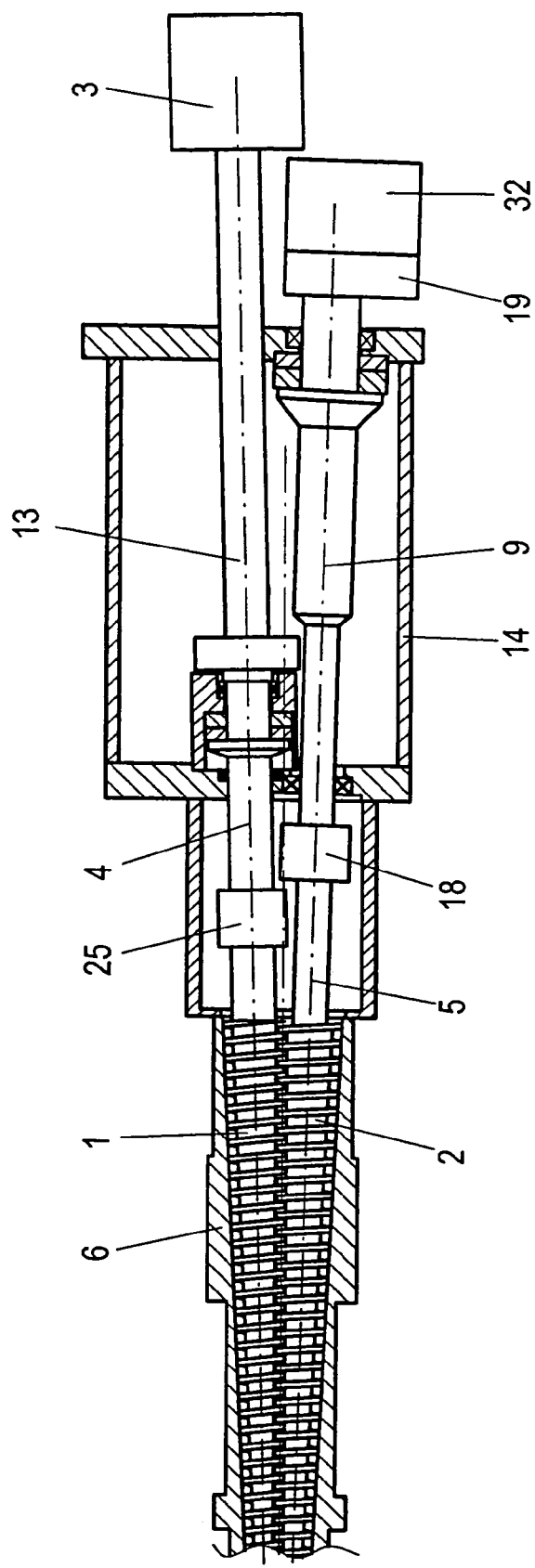

The embodiment of FIG. 6 also shows a twin-screw extruder, whose screws 1, 2 rotating in the same direction are implemented as conical, so that the screw axes 4, 5 do not lie parallel to one another. In this embodiment, the cited deceleration and acceleration of the rotational movement of one of the screws (in relation to the constant rotational movement of the other screw) is not achieved by a universal shaft, but rather separate motors 3, 32 are provided for the two screws 1, 2. The motor 3 drives the screw 1 at constant peripheral velocity (which may be adjustably selectable, however), the motor 32, in contrast, is provided with the cited apparatus 19, which provides the screw 2 driven thereby with a periodic acceleration and deceleration superimposed on the constant speed. The size of this acceleration and deceleration is expediently adjustably changeable. Suitable electronic controllers are available for this purpose.

The embodiment of FIG. 7 shows a twin-screw extruder whose construction is similar to that of FIG. 1, a difference only exists in that the two screws 1, 2 rotating in the same direction are not implemented as conical, but rather cylindrical, so that the two screw axes 4, 5 run parallel to one another. The two drive shafts 9, 13 are also parallel to one another, which results in a very simple design. The two angles α, β are therefore equal to one another. To also achieve the cited desired periodic deceleration and acceleration of the rotational movement of the screw 1 in such a design, the output-side Cardan joint 21 is pivoted by a suitable amount in relation to the drive-side Cardan joint 20 around the axis 24 connecting the two Cardan joints. This relative pivoting of the two Cardan joints 20, 21 may be achieved easily by a coupling according to FIGS. 3, 4. As noted therein, the cited relative pivoting of the two Cardan joints 20, 21 may be adjustably selectable, so that one may adapt to various conditions of the material to be processed.

The embodiment from FIG. 8 forms a combination of the embodiments from FIGS. 6 and 7. The two screws 1, 2 rotating in the same direction are cylindrical, as in FIG. 7, however, the apparatus 19 which provides the rotational movement of the screw 2 with a periodic deceleration and acceleration in relation to the rotational movement of the screw 1 is implemented as in the embodiment from FIG. 6. As shown in FIG. 8, a change of the type of the cited periodic rotational movement change of the screw 1 may additionally be achieved by a coupling 27 for this purpose.

A further possibility for the variation of the periodic change of the axial width of the gap 8 is to make the position of the axial direction of the output shaft 22 adjustably changeable in relation to the position of the axial direction of the drive shaft 13.

The configuration of separate motors 3, 32 for the drive of the two screws 1, 2 makes it possible to make the drive shaft 13 adjustable in the housing 14 in regard to its direction without problems, e.g., by a suitable pivot mount.

A further possible design for achieving the periodic change of the width of the gap 8 between opposite screw channels 7 of the two screws 1, 2 is to provide one of the two screws with a periodic back-and-forth movement in the direction of its axis, this movement being superimposed on the rotational movement of the screw. An additional drive is necessary for this screw for this purpose. This additional drive may be implemented in such a manner that a fixed curve path is provided, on which a tappet connected to the affected screw runs as the screw rotates. It is expedient to implement such a tappet as a rotor to avoid friction losses. Another possible design comprises forming the cited additional drive by a piston-cylinder assembly, which causes the periodic back-and-forth movement of the screw. Of course, the rotational drive of the affected screw must be implemented appropriately in both cases to permit the cited back-and-forth movement.

Of course, it is also possible to implement all described designs in such a manner that the two screws 1, 2 rotate in opposite directions. A simple possible design for this purpose is to couple the two drive shafts 9, 13 of the two screws 1, 2 to one another via gear wheels. Which of the two types of drive (opposite or identical directions) is selected for the screws 1, 2 is a function of the existing conditions, conical screws running in the same direction are typically most favorable.

Although the pitch of the screw channels of the two screws 1, 2 is shown as constant in FIGS. 7 and 8, it is also possible, of course, to implement this pitch as varying over the screw length in such a manner that the desired compaction of the material results in the conveyance direction of the screws 1, 2.

Figure 9:
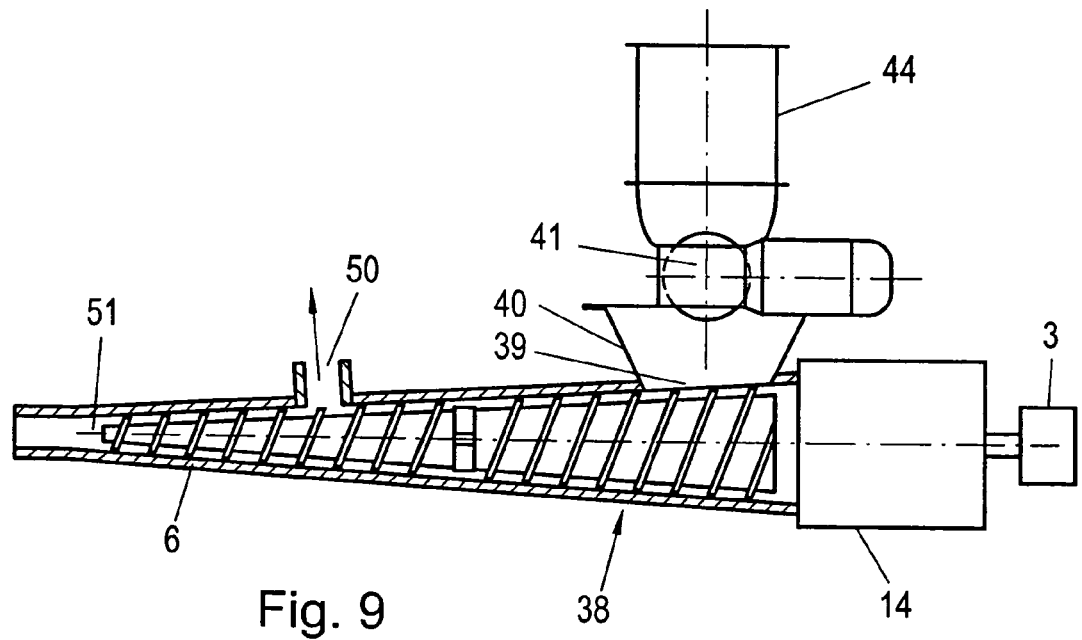
FIG. 9 schematically shows the components used to fill the device in a side view, partially in section.
Figure 10:
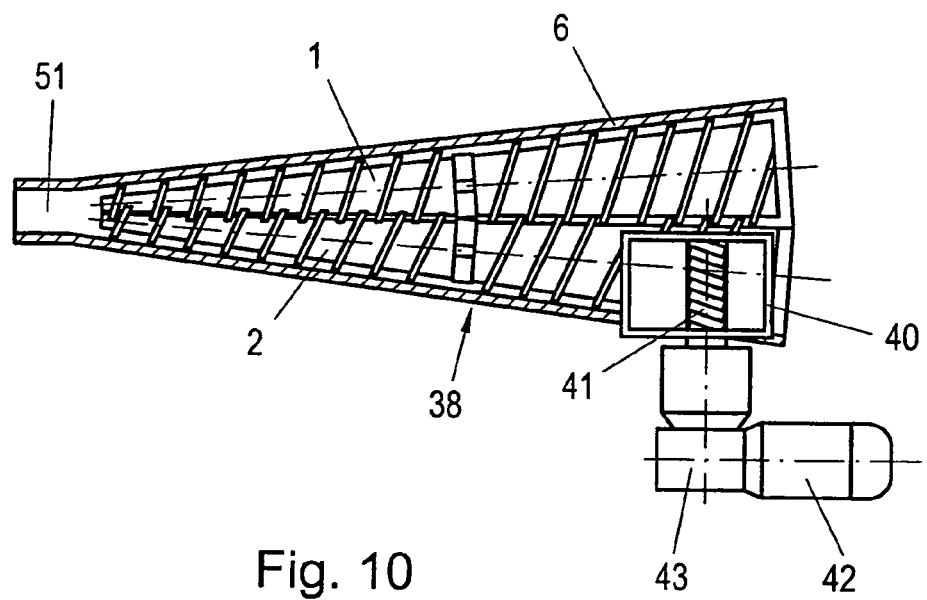
FIG. 10 is a top view of FIG. 9, partially in section.
Figure 11:
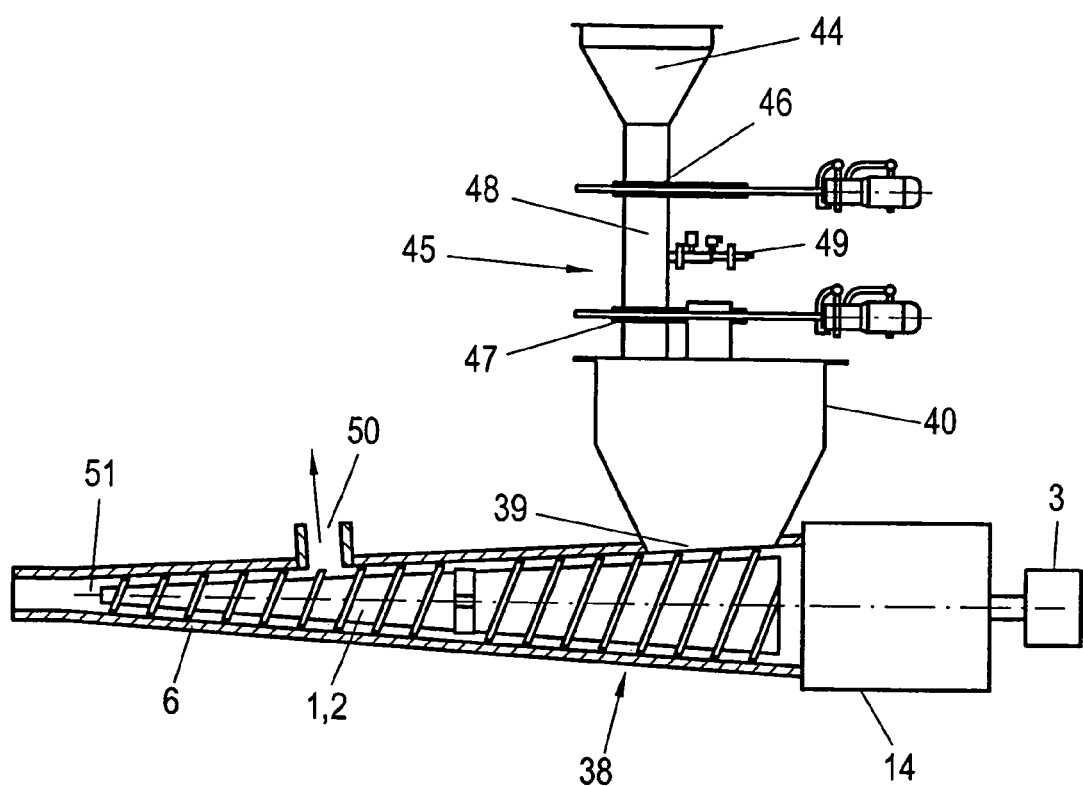
FIG. 11 shows an embodiment variant of FIG. 9.

The filling of twin-screw extruders, as were described above, is shown in FIGS. 9 through 11. The twin-screw extruder 38 (FIGS. 9, 10) provided with the device according to the invention has an intake opening 39 of the screw housing 6 situated in the area of one front end of the screws 1, 2. A funnel 40 is connected to this intake opening 38, against whose top side a horizontally mounted dosing screw 41 presses, which is driven by a motor 42 via a gear 42 in such a manner that material supplied from above via a supply funnel 44 to the dosing screw 38 is always supplied in the desired quantity to the screws 1, 2, so that both overfilling and also idling of the screws are avoided. The material to be processed is frequently thermoplastic material which is to be reprocessed for recycling purposes. This material is frequently formed by PET milled product, which is formed by crushed bottles and must be melted under vacuum, so that oxidation and degradation of the material are avoided as much as possible. If such vacuum handling is desired, the supply of the material shown in FIGS. 9 and 10 must occur under a vacuum seal, a design suitable for this purpose is shown in FIG. 11. For this purpose, a vacuum hose 45 is connected to the funnel 40, which may be terminated on the top and bottom by sliders 46, 47 closing vacuum tight in a way known per se, so that its inner chamber 48 may be evacuated via an evacuation line 49. The dosing screw 41 is not shown in FIG. 11 for the sake of simplicity.

Another frequently existing application is the compounding of plastics of different types, e.g., polyethylene of lower and higher densities, or polypropylene with polyethylene. The cited periodic change of the width of the gap 8 between opposing screw channels 7 favors the achievement of a desired high degree of mixing. Such a high degree of mixing also results during the processing of pasty and/or powdered materials, of whatever type, e.g., ceramic or mineral materials, such as clay, etc.

At least one degassing opening 50 may be provided in the housing 6 of the screws 1, 2, to which a suction line (not shown) may be connected, via which gas may be suctioned out of the inner chamber of the screw housing 6.

The material mixed and/or plasticized and/or agglomerated by the screws 1, 2 is discharged out of the screw housing 6 through at least one outlet opening 51 at the front end of the screw housing 6 facing away from the intake opening 39. An extruder head or a suitable molding facility may be connected to this outlet opening 51.

In certain applications, it may be advantageous to permit a leakage flow in the two screws 1, 2. Suitable measures for this purpose are known, e.g., flattening at least some screw channels 7 and/or incorporating grooves on at least some flanks of the screw channels 7.

The invention claimed is:

1. A device for mixing and/or plasticizing plastic material, having at least two screws situated adjacent to one another in a shared screw housing, whose screw channels are engaged with one another and are driven to rotate around the particular screw axis by at least one motor, the material to be processed being supplied to the screws through at least one intake opening of the screw housing situated in the area of one front end of the screws and the material processed by the screws leaving the screw housing through at least one outlet opening of the screw housing situated in the area of the other front end of the screws, whereby a mechanism is provided, which alternately imparts a periodic enlargement or reduction in size of the gap that exists between screw channels of the screws that are adjacent to one another, which enlargement or reduction in size is superimposed on the rotational movements of the screw channels (7) of the screws (1, 2), wherein the two screws (1, 2) are components of a twin-screw extruder (38) having conical screws (1, 2) that engage into one another with their screw channels, without making contact, which are driven in the same rotational direction.

2. The device according to claim 1, wherein the apparatus (19) for one (1) of the screws (1, 2) has a universal shaft (26) for the rotational drive of this screw (1), this universal shaft (26) having two Cardan joints (20, 21) connected to one another rotationally fixed, one of which is connected rotationally fixed on its drive side to a driveshaft (13) driven by the motor (3), while in contrast the other Cardan joint (21) is connected rotationally fixed on its output side to an output shaft (22) connected rotationally fixed to the screw (1), the axial direction of the output shaft (22) deviating from the axial direction of the drive shaft (13) and/or the two Cardan joints (20, 21) being pivoted in relation to one another around the axis (24) connecting them.

3. The device according to claim 2, wherein the axial direction of the output shaft (22) is adjustably changeable in relation to the axial direction of the drive shaft (13).

4. The device according to claim 2, wherein the rotationally fixed connection of the two Cardan joints (20, 21) of the universal shaft (26) has a coupling (27), using which the rotational position of one Cardan joint (20) is adjustably changeable in relation to the other Cardan joint (21).

5. The device according to claim 4, wherein the coupling (27) has a receptacle (28) connected rotationally fixed to one Cardan joint (20), which is provided with internal teeth (29), into which receptacle (28) a socket pin (31) connected rotationally fixed to the other Cardan joint (21) is insertable, which has external teeth (30) fitting in the internal teeth (29) on its circumference.

6. The device according to claim 1, wherein the apparatus (19) drives the screws (1, 2) differently for the rotational movement, one screw (2) being driven at constant speed, while in contrast another screw (1) is driven using a periodic acceleration and/or deceleration superimposed on the constant speed.

7. The device according to claim 6, wherein the dimension of the periodic acceleration and/or deceleration is adjustably changeable.

8. The device according to claim 1, wherein the apparatus (19) provides a limited displaceability of one screw (1) in its axial direction in the screw housing (6), and an additional drive is provided for this screw (1), which provides the screw (1) with a periodic back and forth displacement in the axial direction superimposed on its rotation.

9. The device according to claim 8, wherein the additional drive is formed by a piston-cylinder assembly causing the periodic back-and-forth movement of the screw.

10. The device according to claim 1, wherein the periodic change of the gap (8) is 40 to 60%, in particular approximately 50% of the maximum possible gap width.

11. The device according to claim 1, wherein to achieve a leakage flow, the tips of at least some screw channels are flattened and/or grooves are provided on at least some flanks of the screw channels.

* * * * *

UNITED STATES PATENT AND TRADEMARK OFFICE
CERTIFICATE OF CORRECTION

PATENT NO. : 7,632,006 B2  Page 1 of 1
APPLICATION NO. : 12/085489
DATED : December 15, 2009
INVENTOR(S) : Schulz It is certified that error appears in the above-identified patent and that said Letters Patent is hereby corrected as shown below:

On the cover page, Item [22], please change the PCT filing date from "November 23, 2008" to correctly read:    --November 23, 2006--.

Signed and Sealed this

Thirtieth Day of March, 2010

David J. Kappos
*Director of the United States Patent and Trademark Office*